(12) United States Patent
Sperring et al.

(10) Patent No.: US 9,037,277 B1
(45) Date of Patent: May 19, 2015

(54) SYSTEMS AND METHODS FOR INITIATING ACTION BASED ON AUDIO OUTPUT DEVICE

(75) Inventors: Foy C. Sperring, Bay Shore, NY (US); Ajay Arora, New York, NY (US); Taylor J. Huttner, Highland Park, NJ (US)

(73) Assignee: Audible, Inc., Newark, NJ (US)

( * ) Notice: Subject to any disclaimer, the term of this patent is extended or adjusted under 35 U.S.C. 154(b) by 321 days.

(21) Appl. No.: 13/495,829

(22) Filed: Jun. 13, 2012

(51) Int. Cl.
*G06F 17/00* (2006.01)
*H04M 1/60* (2006.01)
*H04R 5/04* (2006.01)

(52) U.S. Cl.
CPC ............... *H04M 1/6058* (2013.01); *H04R 5/04* (2013.01)

(58) Field of Classification Search
CPC ........... H04M 1/6058; H04M 1/72527; H04N 5/765; H04R 5/04; H04S 1/005
See application file for complete search history.

(56) References Cited

U.S. PATENT DOCUMENTS

| 6,674,864 | B1 * | 1/2004 | Kitamura ...................... 381/103 |
| 7,836,216 | B2 * | 11/2010 | Kashi et al. ..................... 710/15 |
| 7,853,343 | B2 * | 12/2010 | Omata ............................. 700/94 |
| 7,908,021 | B1 * | 3/2011 | Bogard ........................... 700/94 |
| 8,594,815 | B2 * | 11/2013 | Konetski et al. ................ 700/94 |
| 2002/0038158 | A1 * | 3/2002 | Hashimoto et al. ............. 700/94 |
| 2006/0016324 | A1 * | 1/2006 | Hsieh ............................. 84/622 |
| 2006/0020968 | A1 * | 1/2006 | Kroll et al. ..................... 725/37 |
| 2007/0294773 | A1 * | 12/2007 | Hydrie et al. ................... 726/27 |
| 2008/0154406 | A1 * | 6/2008 | Nunokawa ....................... 700/94 |
| 2008/0279390 | A1 * | 11/2008 | Woolfork ........................ 381/74 |
| 2008/0303785 | A1 * | 12/2008 | Yun ................................ 345/156 |
| 2008/0318629 | A1 * | 12/2008 | Inha et al. ...................... 455/557 |
| 2009/0167508 | A1 * | 7/2009 | Fadell et al. ............... 340/407.2 |
| 2009/0180643 | A1 * | 7/2009 | Sander et al. ................. 381/111 |
| 2009/0323975 | A1 * | 12/2009 | Groesch ....................... 381/71.1 |

* cited by examiner

*Primary Examiner* — Andrew C Flanders
(74) *Attorney, Agent, or Firm* — Sutherland Asbill & Brennan LLP

(57) ABSTRACT

Described herein are systems, methods, and apparatus for initiating one or more actions based at least in part on an audio output device. Upon connection of an audio output device such as headphones one or more actions may be configured to occur. These actions may include playing at least a portion of an audio content, presenting information on a display, and so forth.

16 Claims, 10 Drawing Sheets

| Audio Output Device Identity | Impedance | Channels | Wiring Schedule | Identification Value |
|---|---|---|---|---|
| 106(1) | - | 2 | - | 8484516SAL14 |
| 106(2) | 8.5 ohms | 2 | 5 | ADTL3901 |
| 106(3) | - | 1 | - | 9KSA1L30 |
| 106(4) | 7.9 ohms | 2 | 9 | - |
| 106(5) | - | 5 | - | TX2K7L90 |

Pre-determined Operating Characteristics 204

FIG. 2

| Audio Output Device Identity (202) | Action (302) | Action Frequency (304) |
|---|---|---|
| 106(1) | Play audio product trademark | Always |
| 106(2) | Play audio book service promo | Once |
| 106(2) | Play volume setting warning | Weekly |
| 106(3) | Play conference call device feature promo | Once |
| 106(3) | Play audio command input prompt | Daily |
| 106(4) | Adjust equalizer to compensate for low bass | Always |
| 106(4) | Play Museum Location Data | On location |
| 106(4) | Play and display brand X headphone ad | Until accepted |
| 106(5) | Play audio book service promo | Monthly |
| Unknown | Play audio book service promo | Always |

SYSTEMS AND METHODS FOR INITIATING ACTION BASED ON AUDIO OUTPUT DEVICE

BACKGROUND

Users access a wide array of content with user devices such as portable media players, smartphones, electronic book readers, laptops, tablet computers, and so forth. The content may comprise audio, video, and so forth. These user devices may include internal acoustic transducers, and/or the capability to connect to audio output devices external to the user device. These audio output devices may comprise acoustic transducers configured to provide audible sound to the user or users.

BRIEF DESCRIPTION OF THE DRAWINGS

FIG. 2 illustrates a lookup table associating an audio output device identity with one or more pre-determined operating characteristics in accordance with an embodiment of the disclosure.

FIG. 3 illustrates a lookup table associating an audio output device identity with one or more actions in accordance with an embodiment of the disclosure.

DETAILED DESCRIPTION

Users access a wide array of content with user devices. The content may comprise audio, video, images, and so forth. These user devices include portable media players, smartphones, electronic book readers, laptops, tablet computers, and so forth. The audio content may be presented audibly to one or more users by one or more audio output devices. These audio output devices are external to the user devices and include external acoustic transducers, headphones, headsets, earphones, vehicle audio systems, and so forth. The audio output devices may comprise acoustic transducers configured to generate an audible sound.

This disclosure describes systems and methods for initiating one or more actions based at least in part upon an identification of an audio output device connected to the user device. These actions may include playing at least a portion of audio content, presenting information on a display, generating a haptic output, starting an application, and so forth. Thus, the detection of a particular audio output device connected to the user device may be used as a user input to initiate one or more actions. For example, when a user connects a pair of headphones to the user device, audio content describing availability of an audio book service may be presented via the headphones. The actions may differ based upon the identity of the audio output device, type of connection used to couple to the audio output device, identity of the user, location, and so forth.

Illustrative System

Figure 1:
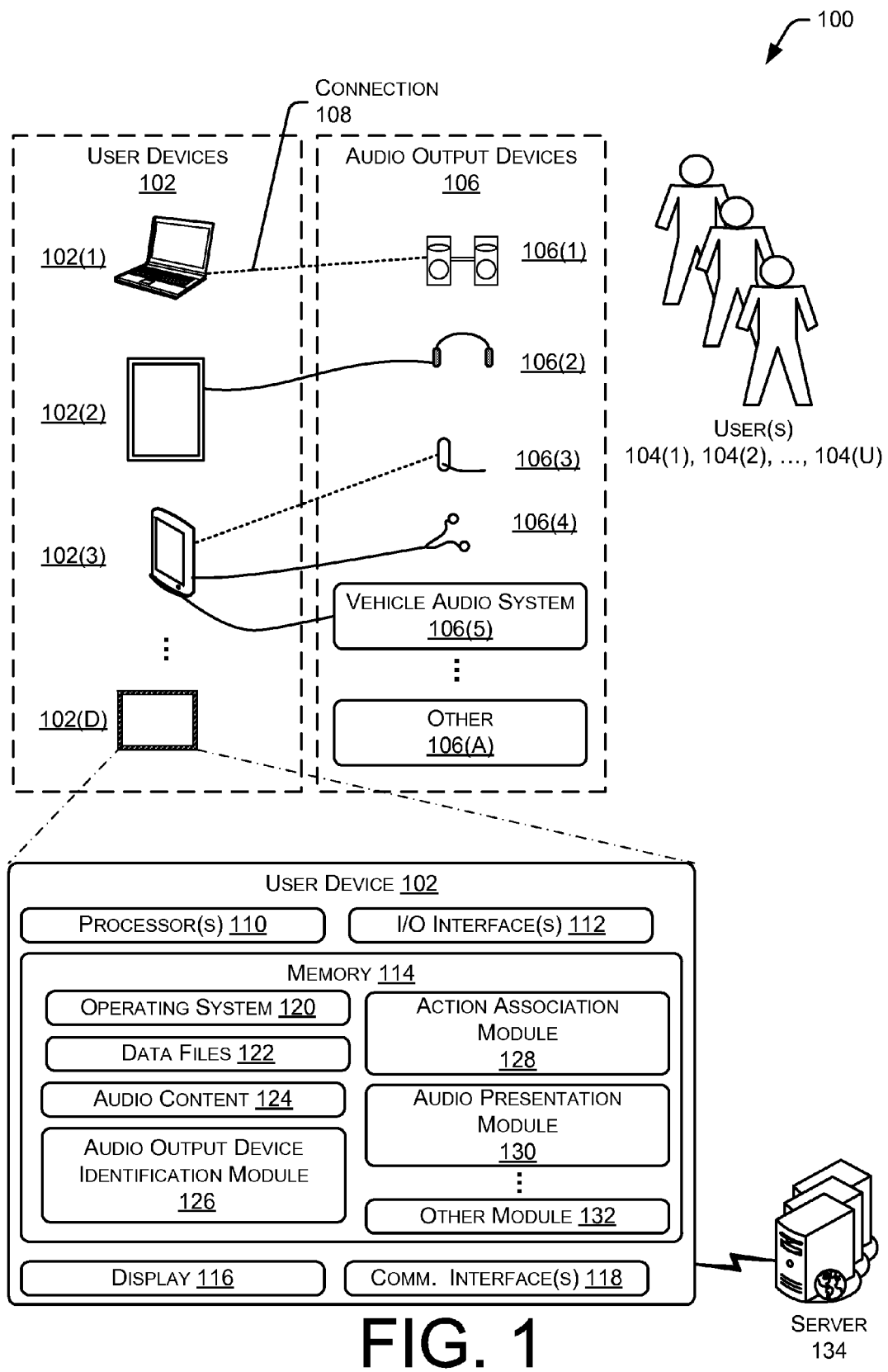
FIG. 1 illustrates a system for initiating an action based on an audio output device in accordance with an embodiment of the disclosure.

FIG. 1 illustrates a system 100 for initiating an action based on an audio output device. One or more user devices 102(1), 102(2), . . . 102(D) may be used by one or more users 104(1), 104(2), . . . 104(U). As used herein, letters enclosed by parenthesis such as "(U)" indicate an integer having a value greater than zero. The user devices 102 may include smartphones, laptops, desktops, tablet computers, media players, televisions, set-top boxes, game consoles, and so forth.

One or more audio output devices 106(1), 106(2), . . . , 106(A) may be used to generate or reproduce sound perceptible to the one or more users 104. The audio output devices 106 may comprise one or more acoustic transducers such as speakers. As used herein, an acoustic transducer is a device configured to generate an output audible to a user as sound. This output may be provided in the form of compressive waves generated and transmitted in a fluid such as ambient air. These compressive waves may be generated using electromagnetic coils, electrostatic devices, piezoelectric devices, and so forth. In some implementations the audio output device 106 may generate electrical stimulation which is perceived by the user 104, such as with a cochlear implant. The audio output devices 106 may include external speakers 106(1), headphones 106(2), headsets 106(3), earphones 106(4), vehicle audio systems 106(5), and other devices 106(A) such as hearing aids, cochlear implants, and so forth.

The audio output device 106 may also comprise one or more proximity sensors or other sensors configured to determine when the user 104 is close to the audio output device 106, or wearing it. For example, a pressure switch may be configured to determine when the headphones 106(2) are worn by the user 104. In another example, a capacitive proximity sensor may determine when the earphones 106(4) are being worn by the user 104.

In some implementations, the audio output devices 106 may be sponsored or provided by a particular entity. One or more audio output devices 106 may couple to the user devices 102 with a connection 108. The connection 108 may be established via a physical coupling such as with electrical conductors or optical waveguides, or a wireless coupling such as with a radio transmitter and receiver. In this figure, for illustration and not by way of limitation, wired connections are indicated with a solid line while wireless connections are indicated with a broken line.

The user devices 102 may comprise one or more processors 110, one or more input/output ("I/O") interfaces 112, one or more memories 114, one or more displays 116, and one or more communication interfaces 118.

The one or more I/O interfaces 112 allow for coupling devices such as the audio output devices 106, keyboards, joysticks, touch sensors, cameras, microphones, haptic output devices, external memories, and so forth to the user device 102. The I/O interfaces 112 may be used to establish the connection 108. In one implementation, the I/O interface 112 may comprise a plurality of electrical conductors configured to complete an electrical connection with the audio output device 106. The plurality of electrical conductors is configured to complete an electrical connection during coupling or connection with the audio output device. An indication of the connection may be generated based at least in part on completion of an electrical circuit with at least a portion of the electrical conductors. For example, the I/O interfaces 112 may include an audio jack configured for use with one or more of the headphones 106(2), the headsets 106(3), the earphones 106(4), and so forth. Insertion of a connector of the headphones 106(2) into the audio jack may complete an electrical circuit and generate the indication.

In another implementation, the I/O interfaces 112 may include a wireless communication device configured to provide a wireless audio connection with the audio output device 106. The wireless audio connection may be a personal area network ("PAN") configured to transfer audio content. In some implementations, the connection 108 may be established using the communication interface 118 described below, such as when sending audio content to an audio output device 106 via a local area network connection.

The processor 110 may comprise one or more cores and is configured to access and execute at least in part instructions stored in the one or more memories 114. The one or more memories 114 comprise one or more computer-readable storage media ("CRSM"). The one or more memories 114 may include, but are not limited to, random access memory ("RAM"), flash RAM, magnetic media, optical media, and so forth. The one or more memories 114 may be volatile in that information is retained while providing power or non-volatile in that information is retained without providing power.

The display 116 is configured to present visual information to the user 104. The display 116 may comprise a reflective or emissive display configured to present images to the user 104. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 116 may be configured to present images in monochrome, color, or both. In some implementations, the display 116 of the user device 102 may use emissive, reflective, or combination displays with emissive and reflective elements.

The one or more communication interfaces 118 provide for the transfer of data between the user device 102 and another device directly such as in a peer-to-peer fashion, via a network, or both. The communication interfaces 118 may include, but are not limited to, personal area networks ("PANs"), wired local area networks ("LANs"), wireless local area networks ("WLANs"), wireless wide area networks ("WWANs"), and so forth. The communication interfaces 118 may utilize acoustic, radio frequency, optical, or other signals to exchange data between the user device 102 and another device such as an access point, a host computer, a router, another user device 102, and the like.

The one or more memories 114 may store instructions for execution by the processor 110 to perform certain actions or functions. These instructions may include an operating system 120 configured to manage hardware resources such as the I/O interfaces 112 and provide various services to applications executing on the processor 110. The one or more memories 114 may also store data files 122 including information about the operating system 120, configuration files, advertisements, electronic books, and so forth. Audio content 124 may also be stored in the one or more memories 114. The audio content 124 may comprise recorded human voices, music, synthesized human speech, audible promotional messages, or other sounds. For example, the audio content 124 may comprise an audible promotional message talking about an audio book service.

An audio output device identification module 126 is stored in the one or more memories 114. The audio output device identification module 126 is configured to determine an identity of the audio output device 106 which is connected to the user device 102. The identity of the audio output device 106 may include, but is not limited to, determination of a make, a model, a brand, a category of device, particular unique device, designation of the device as unknown, and so forth. The category of device may designate whether the device is a pair of headphones, external speakers, earphones, a vehicle audio system, and so forth. For example, the audio output device identification module 126 may identify the audio output device 106 as stereo headphones 106(2) made by XYZ Corporation, model A.

The audio output device identification module 126 may also be configured to maintain a log or history of identity and actions relating to the audio output devices 106 such as connection, disconnection, or both, over time. This historical data may be accessed by the action association module 128 to select an action and described below with regard to FIG. 3.

The audio output device identification module 126 may determine or receive from the I/O interfaces 112 establishing the connection 108 one or more characteristics of the audio output device 106 connected to the user device 102. The one or more characteristics may include, but are not limited to, wiring configuration, impedance, identification value associated with the audio output device, and so forth. For example, the wiring configuration may be used to distinguish an audio output device 106 with two speakers (stereo) from one with a single speaker (mono).

The audio output device identification module 126 may then compare the determined one or more characteristics with at least a portion of previously stored identity data to identify the audio output device 106. Based at least in part on the comparison, the audio output device 106 may be identified. For example, a particular impedance value present in a set of speakers connected 108 to the I/O interface 112 using a wire may be looked up and used to identify the audio output device 106 as the earphones 106(4). The audio output device identification module 126 is discussed below in more detail.

The one or more memories 114 may also include an action association module 128. The action association module 128 is configured to associate one or more actions with the identified audio output device 106. The association may be pre-determined or change dynamically. Once an action is associated, the action association module 128 may initiate the action, or pass the action to another module or the operating system 120 for initiation. These actions may be configured to execute at least in part on the processor 110. The actions may include, but are not limited to, presenting at least a portion of the audio content 124 using the audio output device 106, presenting information on the display 116 of the user device 102, generating a haptic output, executing instructions on a processor, and so forth. For example, the action may be pre-determined such that when the earphones 106(4) are plugged into the I/O interface 112, the audio content 124 of an audio book service promotion is played over the earphones 106(4).

The action association module 128 may be configured to select an action based at least in part on conditions associated with the user device 102, the audio output device 106, data received, or a combination thereof. This information may be received from the server 134 in some implementations. For example, the action association module 128 may select an action of playing an advertisement for sunscreen based on weather data indicating sunny weather and time of day The action association module 128 may be configured to delay or defer an action. This delay or deferral may be dependent upon the identity of the audio output device 106. For example, the action association module 128 may be configured to wait for five seconds after connection with the earphones 106(4) to provide an opportunity for the user 104 to don the earphones before playing the audio content 124. In comparison, when the external speakers 106(1) are connected, the action to play the audio content 124 may occur immediately.

An audio presentation module 130 may be stored in the one or more memories 114. The audio presentation module 130 is configured to present at least a portion of the audio content 124 using one or more audio output devices 106. Other modules 132 may also be present in the one or more memories 114. These modules may be configured to present information on the display 116, recognize speech, present video, and so forth.

The user device 102 may couple to one or more other devices using the communication interfaces 118 such as one or more servers 134. These servers 134 may be configured to provide content including audio content 124 such as audiobooks, music, lectures, and so forth. The servers 134 may also be configured to provide electronic books, advertisements, video, and so forth.

While various functions are described above with respect to particular devices, it is understood that these functions may be distributed in many ways across the devices. For example, the server 134 may be configured to provide the functionality of the action association module 128.

FIG. 2 illustrates a lookup table 200 associating an audio output device identity 202 with one or more pre-determined operating characteristics 204. The lookup table 200 may be stored in the data files 122 in the one or more memories 114, retrieved from the server 134, or a combination thereof. The audio output device identification module 126 may access the lookup table 200 to determine an identity of the audio output device 106 which is connected to the user device 102. A table structure is depicted for illustration and not by way of limitation, as other data structures may be used such as arrays, linked lists, databases, and so forth.

A particular audio output device 106 may have an identity 202 entry in the lookup table 200. This identity 202 entry may be used as a referent to the particular audio output device 106. The identity 202 entry may be associated with a particular brand, make, model, and so forth, or may refer to a unique audio output device 106. Associated with each of the identity 202 entries are one or more pre-determined operating characteristics 204. These pre-determined operating characteristics 204 may include impedance 206, channels 208, wiring schedule 210, identification value 212, and so forth. Impedance 206 may express a measurement of the electrical impedance of the audio output device 106 when the connection 108 comprises a physical connection, such as plugging a headphone jack into a corresponding receptacle on the user device 102. Due to differences in construction between manufacturers, variations in parts and assembly, and so forth, the impedance 206 may provide a useful indicia of identity.

The channels 208 supported by the device may also be considered when determining the identity 202 of the audio output device 106. The channels 208 may comprise information such as whether the audio output device 106 is monaural, binaural, supports multichannel schemes such as surround sound, and so forth. For example, as shown here, the headset 106(3) is monaural with one channel, while the vehicle audio system 106(5) supports five channels (front left, front right, front center, rear left, and rear right).

The wiring schedule 210 indicates a particular wiring configuration or pinout of the connector. In one implementation, a tip, ring, sleeve ("TRS") connector may be used to couple the audio output device 106 to the user device 102. The TRS connector may implement a variety of configurations ranging from tip-ring to tip-ring-ring-sleeve ("TRRS"), and so forth. Furthermore, these connectors may be configured to provide particular electrical characteristics, such as a resistance to flow in a particular direction using diodes, continuity to ground, and so forth. Information about a particular configuration is recorded as a particular wiring schedule 210 or set of data. For example, wiring schedule 5 associated with the audio output device 106(2) may indicate that a stereo TRS configuration is used. In comparison, the audio output device 106(4) implements wiring schedule 9 that indicates that a TRRS configuration is used, such as where the earphones may contain a button or other control.

The audio output device 106 may also provide an identification value 212. The identification value 212 may be data which is transmitted via a physical connection or wirelessly. This identification value 212 may comprise a wireless connection identifier, a device identifier, a model number, manufacturing information, and so forth. For example, where the audio output device 106(1) is coupled via the personal area network of the I/O interface 112, the identification value 212 may comprise device identification profile ("DIP") information such as supported by the Bluetooth™ PAN standard.

By comparing data acquired from the audio output device 106, with the one or more pre-determined operating characteristics 204, the audio output device identification module 126 may determine the identity of the audio output device 106. In some implementations, the audio output device identification module 126 may be configured to identify audio output devices 106 which are unconnected with the user device 102. For example, the audio output device identification module 126 may be configured to identify proximate audio output devices 106 which are unconnected to any user device 102 or which are connected to other user devices 102(D).

This information as to presence, connection status, identity, and so forth may be used by the action association module 128 to select an action. For example, the presence of audio output devices 106 above a pre-determined threshold may result in selecting and playing a particular audio promotion upon connection of the headphones 106(2).

FIG. 3 illustrates a lookup table 300 associating an audio output device identity 202 with one or more actions 302. The lookup table 300 may be stored in the data files 122 in the one or more memories 114, retrieved from the server 134, or a combination thereof. In some implementations, the lookup tables 200 and 300 may be combined. The action association module 128 may access the lookup table 300 to determine one or more actions associated with the audio output device 106.

A particular audio output device 106 may have an identity 202 entry in the lookup table 300. One or more corresponding actions 302 may be associated with one or more identity 202 entries. Some identity 202 entries may be associated with no actions, or a null entry.

In some implementations the identity of the audio output device 106 may be ambiguous or otherwise indeterminate. An entry for an unknown audio output device 106 may be provided in the lookup table 300. The entry for an unknown audio output device 106 provides for an action 302 to be associated with connection or disconnection of the unknown audio output devices 106.

The one or more actions 302 may be configured to initiate or otherwise execute at least in part on the processor 110. In some implementations, the one or more actions 302 may be contingent or dependent on other conditions or data. For example, the one or more actions 302 may be dependent upon a determination by a proximity sensor of the user device 102 or the audio output device 106 which indicates that the user 104 is nearby or wearing the audio output device 106, and thus is in a position to see or hear the results of the one or more actions 302 when they are initiated. In another implementation, receipt by the user device 102 of weather data or other information may be used to configure an action 302. For example, the one or more actions 302 may be configured to check weather, and if the weather is rainy, select an advertisement for covers suitable for the user device 102.

In some implementations, the one or more actions 302 may be defined by the entity sponsoring a particular audio output device 106. The actions 302 may include playing at least a portion of audio content, presenting information on a display, generating a haptic output, starting an application, turning off a display backlight, reconfiguring a graphic equalizer, and so forth. The actions 302 may also include delays or pauses. For example, the one or more actions 302 associated with the audio output device 106(2) may be to pause for five seconds after connection and then play the audio book service promotional audio content 124.

An action frequency 304 may be associated with a particular action 302 or group of actions. The action frequency 304 specifies how often or under what conditions the action 302 or group of actions will be initiated. The action frequency 304 may be always upon connection, once, weekly, on first connection, and so forth. In some implementation the historical data acquired by the audio output device identification module 126 may be used to determine whether the audio output device 106 has been connected previously, and if so when and how many times. For example, as shown here, when the audio output device 106(3) is connected to the user device 102, two actions 302 may take place. The first of these actions occurs on the first connection and comprises playing a conference call device feature promo via the audio output device 106(3). The second of these actions occurs once a day, and plays an audio command input prompt that informs the user about the audio commands that are available on the user device 102. The action frequency 304 may be configured such that it is contingent or dependent upon another condition, such as receipt of new advertisements, change in user 104 of the user device 102, proximity of the user 104 to the user device 102 and so forth.

The same actions 302 may be associated with different audio output devices 106. For example, as shown here, the audio output devices 106(2) and 106(5) have associated with them actions to play the audio book service promotional message which informs the user 104 about audio book offerings available via the user device 102.

In one example, promotional messages or advertisements may be provided for particular groups of devices. For example, audio output devices 106 of brand A may be associated with the actions 302 of playing on the connected audio output device 106 and presenting on the display 116 an advertisement for brand X headphones. Thus, when the audio output device 106(4) is connected to the user device 102 and identified, the advertisement for brand X headphones would be presented audibly and visually.

Figure 4:
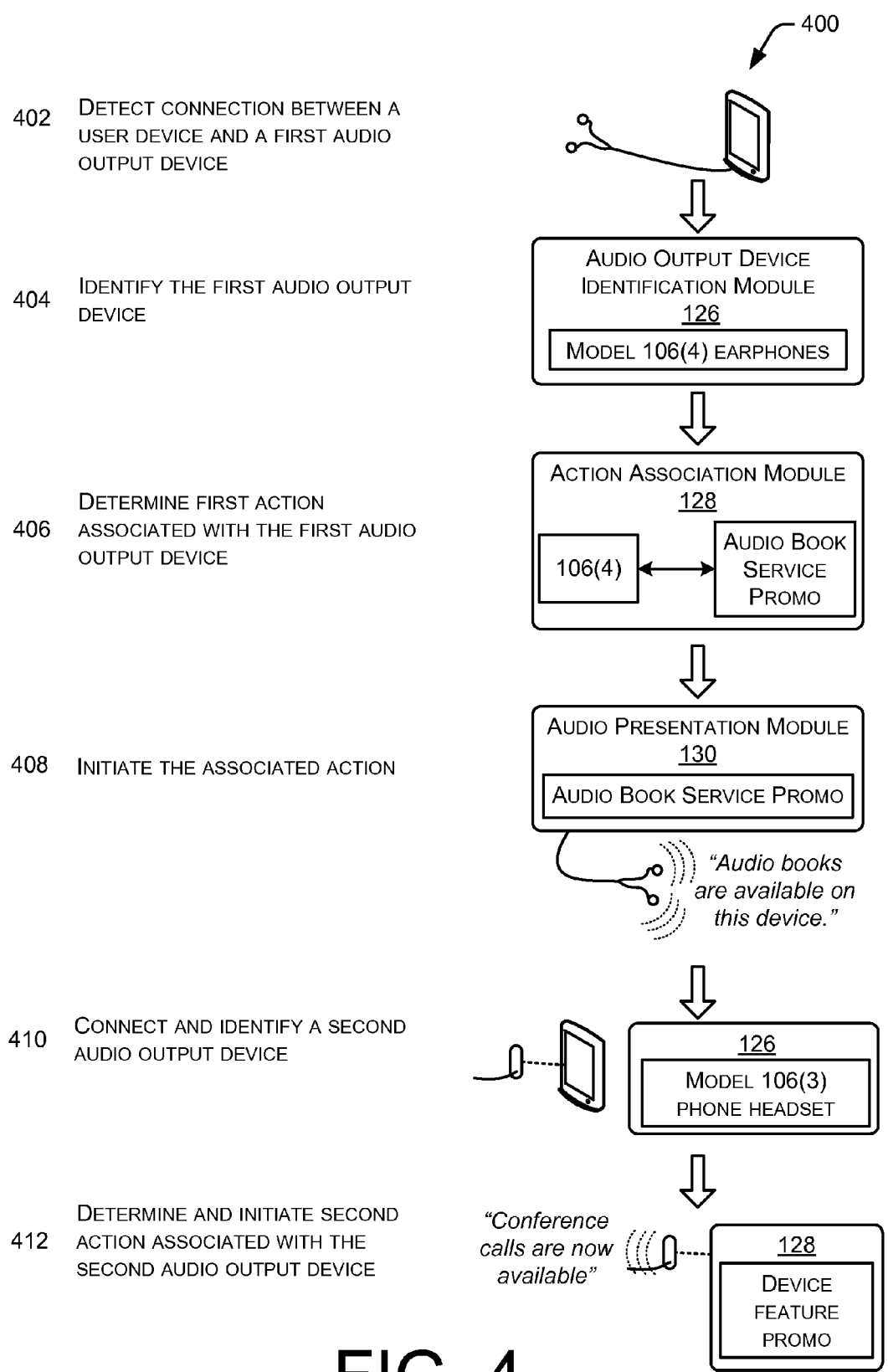
FIG. 4 illustrates operations associated with connecting a user device and audio output devices and corresponding actions in accordance with an embodiment of the disclosure.

FIG. 4 illustrates operations 400 associated with connecting the user device 102 and the audio output devices 106 and corresponding actions 302. Operation 402 detects a connection between the user device 102 and a first audio output device 106, such as the earphones 106(4) depicted here. This connection 108 is shown as being a wired connection, but in some implementations, the connection 108 may be wireless.

Operation 404 identifies the first audio output device 106(4). For example, as described above with regard to FIG. 2, the audio output device identification module 126 may compare the pre-determined operating characteristics 204 as detected with those in the lookup table 200 to determine the identity 202 of the audio output device 106.

Operation 406 determines a first action 302(1) associated with the first audio output device 106(4). As shown in this example, the action association module 128 determines the audio output device 106(4) is associated with the action 302 of playing the audio content 124 comprising an audio book service promo.

Operation 408 initiates the associated action, playing the audio content 124 using the audio output device 106(4). As illustrated, the user hears over the earphones an announcer saying "audio books are available on this device." By providing this action which is triggered at least in part by the connection of the audio output device 106, the user 104 is thus informed about a feature or service which he/she may otherwise be unaware of.

Operation 410 connects and identifies a second audio output device 106(3). For example, the user may have unplugged the audio output device 106(4) from the user device 102, and then connected wirelessly a telephone headset audio output device 106(3). As described above, the audio output device identification module 126 determines the identity of the now connected audio output device 106(3).

Operation 412 determines and initiates a second action 302(2) associated with the second audio output device 106(3). For example, as shown here, connection of the headset may result in the user 104 hearing over the speaker in the headset a message that "conference calls are now available," providing the user 104 with information about a new function.

Illustrative Process

Figure 5:
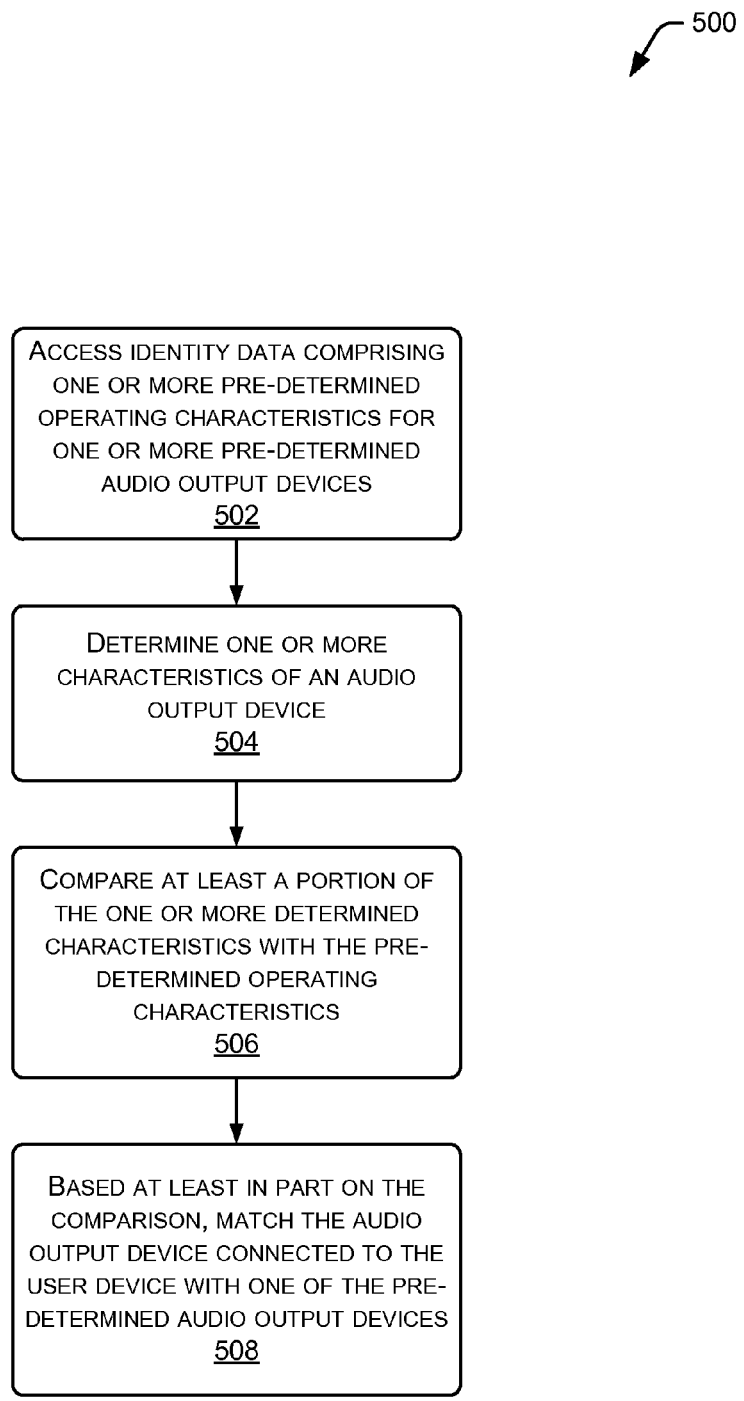
FIG. 5 illustrates a flow diagram of a process of identifying a connected audio output device in accordance with an embodiment of the disclosure.

FIG. 5 illustrates a flow diagram 500 of a process of identifying a connected audio output device. The audio output device identification module 126 may be configured to provide this functionality in some implementations.

Block 502 accesses identity 202 data comprising one or more pre-determined operating characteristics 204 for one or more audio output devices 106; for example, the lookup table 200 of FIG. 2 above.

Block 504 determines one or more characteristics of the audio output device 106 connected to the user device 102. The characteristics comprise those which are measured or determined at or subsequent to connection. The characteristics include, but are not limited to, a wiring configuration, a measured impedance of one or more speakers, determined number of channels, an identification value provided by the audio output device 106, and so forth.

Block 506 compares at least a portion of the determined one or more characteristics with the pre-determined operating characteristics 204. As described above with regard to FIG. 2, the pre-determined operating characteristics 204 may comprise one or more of an impedance 206, channels 208, wiring schedule 210, identification value 212, and so forth. For example, the comparison may check the actual impedance measured with the impedance 206 values of the lookup table 200.

Block 508, based at least in part on the comparison, matches the audio output device 106 connected to the user device 102 with one of the pre-determined audio output devices such as described above with regard to FIG. 2. For example, based on the actual impedance of 7.9 ohms, and the presence of two channels and wiring schedule 9, the audio output device 106(4) is identified.

When the comparison at block 506 is ambiguous, the audio output device 106 may be designated as unknown. In some implementations the user 104 may then be presented with a prompt to select from a list of possible audio output devices 106. For example, when wiring schedule 210 information is unavailable but two channels 208 are detected and the measured impedance 206 indicative of a wired device is within a pre-determined tolerance range, the user 104 may be presented with a prompt asking for selection of the audio output device 106(2) or 106(4).

In some implementations, the user device 102 may be configured to generate a new entry in the lookup table 200 for a previously unidentified audio output device 106. For example, when at block 508 the comparison is unsuccessful, the user 104 may receive a prompt to input information about the audio input device 106. This information may include a make, a model, a manufacturer, a description, and so forth. This information may also be retrieved from the server 134. For example, the user 104 may select the identity 202 of the audio output device 106 from a list of previously purchased audio output devices 106.

Figure 6:
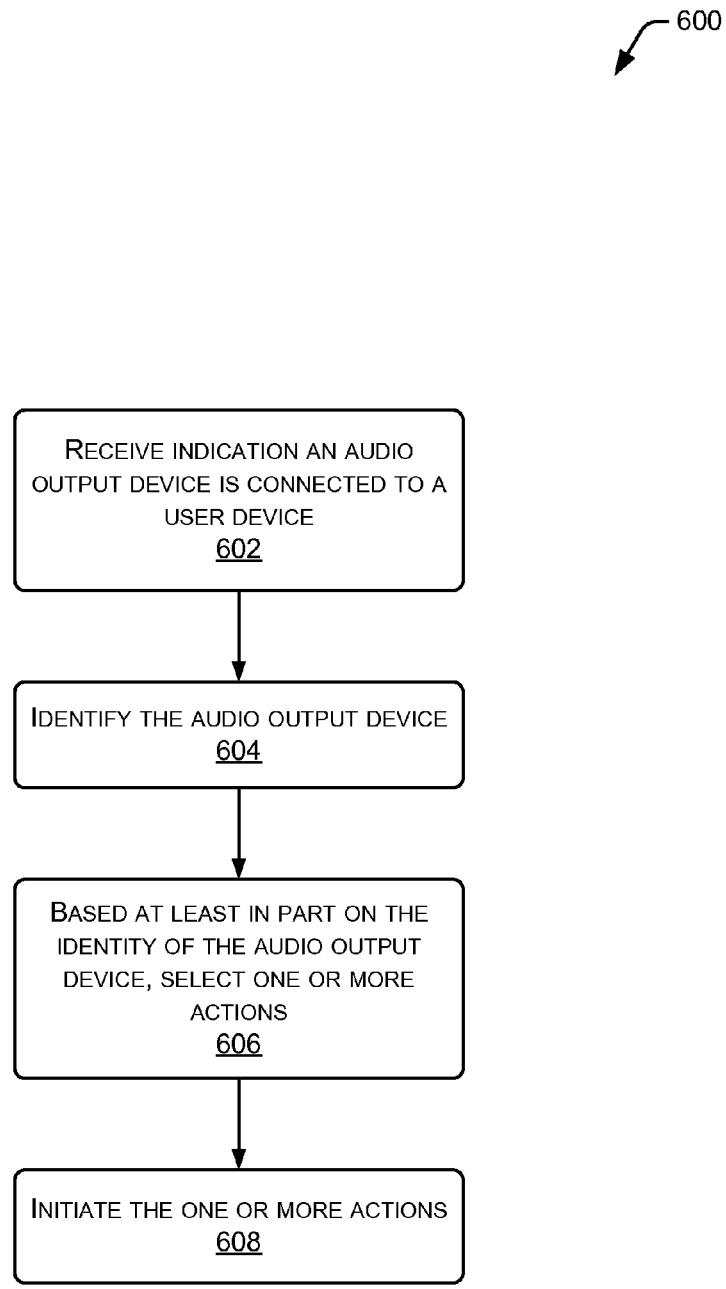
FIG. 6 illustrates a flow diagram of a process of selecting one or more actions based at least in part on identification of a connected audio output device in accordance with an embodiment of the disclosure.

FIG. 6 illustrates a flow diagram 600 of a process of selecting one or more actions 302 based at least in part on identification of a connected audio output device. One or more modules such as the audio output device identification module 126, the action association module 128, and so forth may be configured to provide this functionality in some implementations.

Block 602 receives an indication an audio output device 106 is connected to the user device 102, or a portion thereof such as the I/O interface 112. As described above, this connection may be wired or wireless. For example, the audio output device 106(2) may be connected to the I/O interface 112 which delivers an interrupt or other signal to the processor 110 indicative of the connection. This indication may be generated or issued contemporaneously with the connection, or after the connection. For example, the indication may be generated by a process executing periodically on the processor 110.

In some implementations, an indication may be issued upon disconnection of the audio output device 106. For example, an indication may be issued upon termination of a PAN connection with the audio output device 106(1), or upon unplugging from a jack on the user device 102.

Block 604 identifies the audio output device 106 connected to the user device 102, such as via the I/O interface 112. As described above, this identification may include determining the audio output device 106 to be a known make, model, and so forth, or a determination that the audio output device 106 is unknown. Continuing the example, based on the comparison of the characteristics and the entries in the lookup table 200, the audio output device 106(2) is identified.

Block 606 selects, based at least in part on the identity of the audio output device 106, one or more actions 302 associated with the audio output device 106. As described above with regard to FIG. 3, these actions may include accessing and playing stored audio content 124, presenting a pre-determined message on the display 116, and so forth. For example, based at least in part on the identity being that of the audio output device 106(2), the "play audio book service promo" may be selected. The audio content 124 may comprise recorded human voices, music, synthesized human speech, advertisements, promotional messages, or other sounds.

As also mentioned above, in some implementations, the selection may be based at least in part on conditions associated with the user device 102, the audio output device 106, data received, or a combination thereof. For example, a promotion for an audio book about arctic exploration may be selected for playing when a temperature sensor in the user device 102 indicates below-freezing weather. In another example, the user 104 may be reading an electronic book on the display 116 and then connect the audio output device 106. Based also on the reading of the electronic book, the selection may be for an action in which a prompt announcing an audio version of the electronic book is available, or the action may comprise a prompt to use a text-to-speech feature to read aloud the text version.

In some implementations, the one or more actions 302 selected may be based at least in part on the occurrence of various conditions or status. For example, where the headphones 106(2) are connected and currently being used to play back music when an incoming video call is received, the one or more actions may be configured such that when answered, audio from the incoming video call is routed to a left audio channel while the audio of the music is reduced in volume by half and presented on a right audio channel.

Block 608 initiates the one or more actions. Initiation of the one or more actions may be triggered at least partly in response to receiving an indication the audio output device 106 is connected to the I/O interface 112. For example, this may include accessing stored audio content 124 and presenting at least a portion of the stored audio content 124 with the audio output device 106(2), presenting the pre-determined message on the display 116, and so forth when the audio output device 106(2) is connected. In some implementations, initiation of the one or more actions may be triggered by the disconnection of the audio output device 106. For example, the disconnection of the audio output device 106(2) may initiate the action of presenting the pre-determined message on the display 116.

Figure 7:
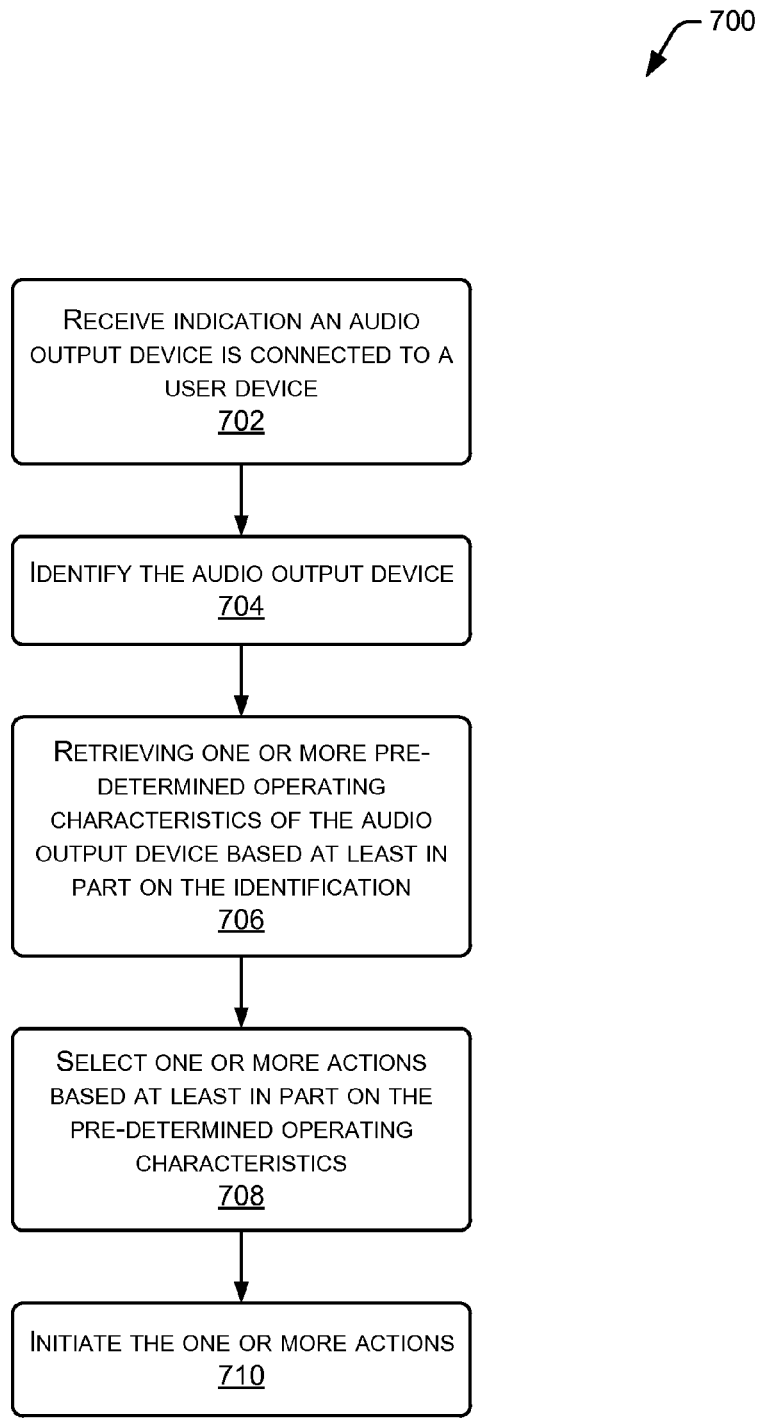
FIG. 7 illustrates a flow diagram of a process of selecting one or more actions based at least in part on pre-determined operating characteristics of an identified audio output device in accordance with an embodiment of the disclosure.

FIG. 7 illustrates a flow diagram 700 of a process of selecting one or more actions 302 based at least in part on the pre-determined operating characteristics 204. The pre-determined operating characteristics 204 of the audio output device 106 attached to the user device 102 may be used to select one or more actions. For example, a monaural version of the audio content 124 may be played back when the headset 106(3), which supports only a single channel, is connected, while a stereo version may be played back when the headphones 106(2) are connected.

As described above with regard to FIG. 6, block 702 receives an indication an audio output device 106 is connected to the user device 102, or a portion thereof such as the I/O interface 112. In another example, connection of the external speakers 106(1) may result in playing an advertisement for a general audience while connection of the earphones 106(4) may result in a private advertisement tailored to a particular user.

Block 704 identifies the audio output device 106(4). As described above, this identification may include determining the audio output device 106 to be a known make, model, and so forth, or a determination that the audio output device 106 is unknown. Block 706 retrieves one or more pre-determined operating characteristics 204 of the audio output device 106 based at least in part on the identification. In some implementations, the pre-determined operating characteristics 204 may be retrieved at least in part from the lookup table 200. For example, the audio output device 106(3) may be determined based on the pre-determined operating characteristic 204 data in the lookup table 200 to be a one channel device with a microphone for input as well. In some implementations, characteristics as determined may be used in place of, or in addition to, the pre-determined operating characteristics 204.

Block 708 selects, based at least in part on the pre-determined operating characteristics 204, one or more actions 302. As described above with regard to FIG. 3, these actions 302 may include accessing and playing stored audio content 124, presenting a pre-determined message on the display 116, and so forth. Continuing the above example, where the audio output device is identified as 106(3) which has monaural output and a microphone for input, the action 302 selected may be to play audio content 124 describing functions available with the microphone input, such as audio input commands which are available.

Block 710 initiates the one or more actions. For example, the audio content 124 describing functions available with the microphone input may be played by the audio presentation module 130.

Figure 8:
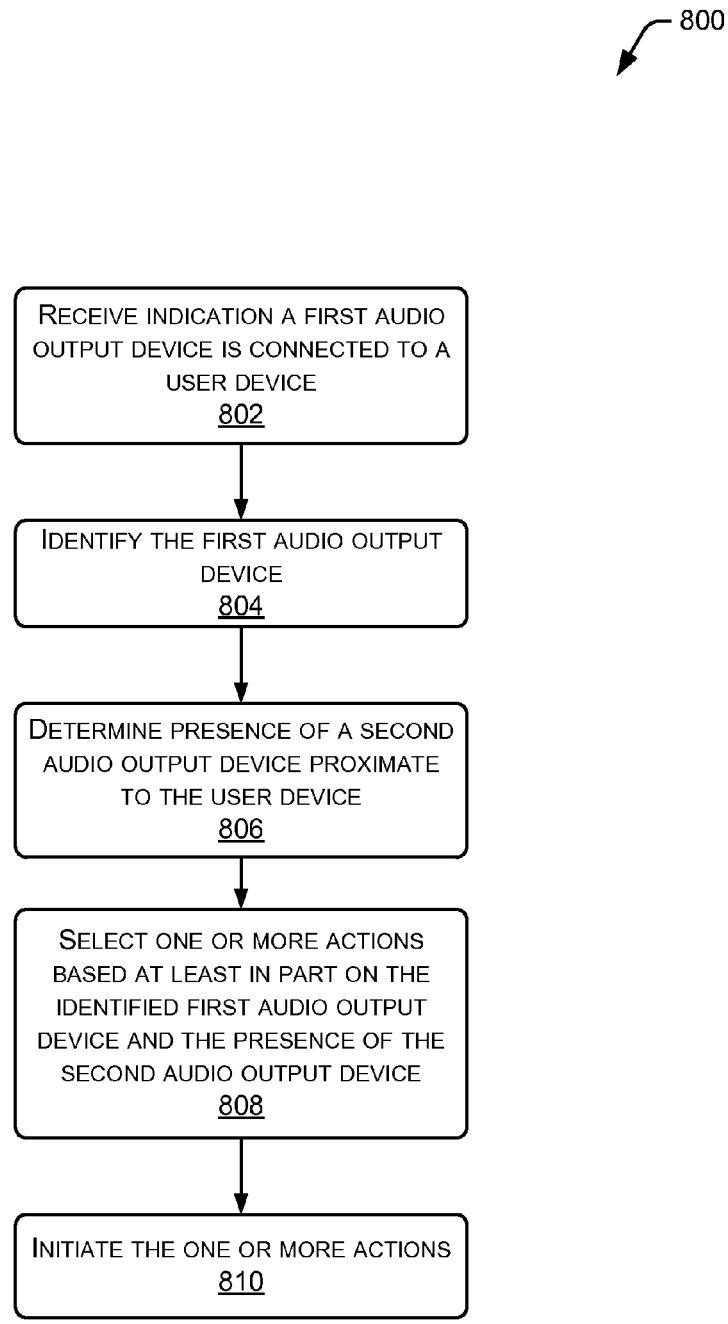
FIG. 8 illustrates a flow diagram of a process of selecting one or more actions based at least in part on an identified audio output device and proximity of another audio output device in accordance with an embodiment of the disclosure.

FIG. 8 illustrates a flow diagram 800 of a process of selecting one or more actions 302 based at least in part on an identified audio output device 106 and the proximity of another audio output device 106. For example, the presence of other audio output devices 106, such as on a train, may be used to provide audio content 124 suited for a crowded environment.

Similar to FIG. 6, block 802 receives an indication a first audio output device 106(1) is connected to the user device 102(1), or a portion thereof such as the I/O interface 112.

Block 804 identifies the audio output device 106(1). As described above, this identification may include determining the audio output device 106 to be a known make, model, and so forth, or a determination that the audio output device 106 is unknown. Block 806 determines the presence of a second audio output device 106(2) proximate to the user device 102. The presence of the second audio output device 106(2) may be determined by receiving a wireless signal, or acquiring data from the other user device 106(2). For example, the I/O interface 112 may be configured to receive information about other audio output devices 106 coupled via personal area networks with other user devices 102, or one or more user devices 102(2)-(D) may report their connection status to the server 134 which in turn provides that connection information in an anonymous fashion to the user device 102(1). In some implementations, the connection information may also include a category or identification of the content being presented via the other audio output devices 106(2)-(A). The proximity may be within a pre-determined radius, within radio reception range of the user device, within a particular room, facility, city, and so forth.

Block 808 selects one or more actions 302 based at least in part on the identified first audio output device 106(1) and the presence of the second audio output device 106(2). As described above with regard to FIG. 3, these actions may include accessing and playing stored audio content 124, presenting a pre-determined message on the display 116, and so forth. Continuing the example, based on the presence of the second audio output device 106(2), an audio book may be selected for presentation rather than music.

Block 810 initiates the one or more actions. Continuing the example, the audio book audio content 124 may be played by the audio presentation module 130.

Figure 9:
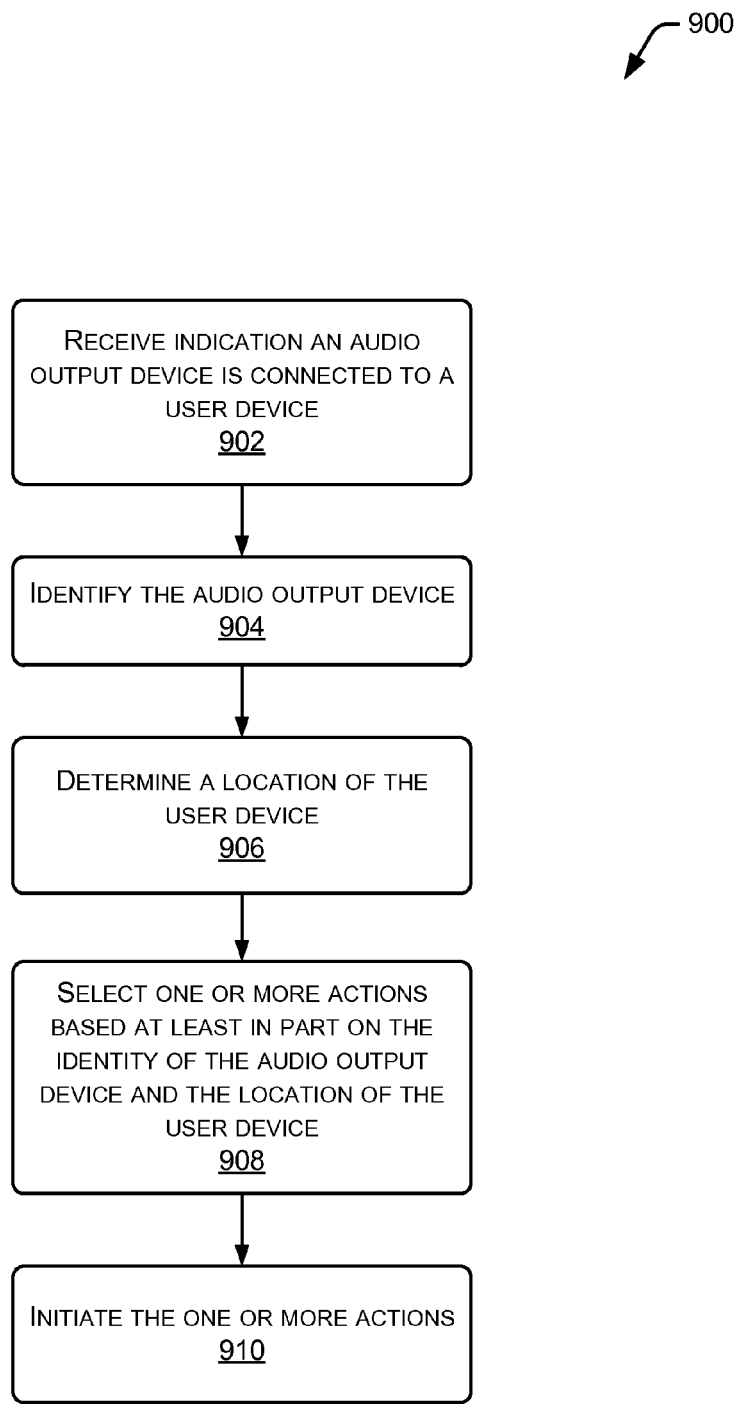
FIG. 9 illustrates a flow diagram of a process of selecting one or more actions based at least in part on an identified audio output device and a location of the user device in accordance with an embodiment of the disclosure.

FIG. 9 illustrates a flow diagram 900 of a process of selecting one or more actions based at least in part on an identified audio output device and a location of the user device.

Similar to FIG. 6, block 902 receives an indication an audio output device 106 is connected to the user device 102, or a portion thereof such as the I/O interface 112.

Block 904 identifies the audio output device 106(1), as described above. Block 906 determines a location of the user device 102. This location may be determined based on input from a global positioning system, cellular data network, manual user input, and so forth. The location may comprise a geographic location (or "geolocation"), or a relative location such as a "living room" or a "kitchen." The location may be associated with a particular activity, such as an "exercise facility," a "restaurant," an "airport," and so forth.

In some implementations the location of the user device 102 may be used to retrieve information about the location. This retrieval may be combined with other data such as date, time of day, and so forth to gather additional information for use in selecting the action. For example, when the location is determined to be a outside a music venue, based on the location, date, and time, a schedule of events may be retrieved indicating that a performance of a particular band is taking place.

Block 908 selects one or more actions 302 based at least in part on the identity of the audio output device 106 and the location of the user device 102. As described above with regard to FIG. 3, these actions may include accessing and playing stored audio content 124, presenting a pre-determined message on the display 116, and so forth. For example, based on the presence of the user device 102 in a historic downtown district, audio content 124 comprising an audio tour describing the downtown district may be selected for presentation. Continuing the example, during the audio tour the user walks past the music venue at which the particular band is playing, and an audio clip of the band's work may be selected for playback. As another example, when a location is designated as an airport, messages appropriate to air travel may be presented.

Block 910 initiates the one or more actions. For example, the audio tour audio content 124 or the audio clip of the band performing may be played by the audio presentation module 130 via the connected audio output device 106.

Figure 10:
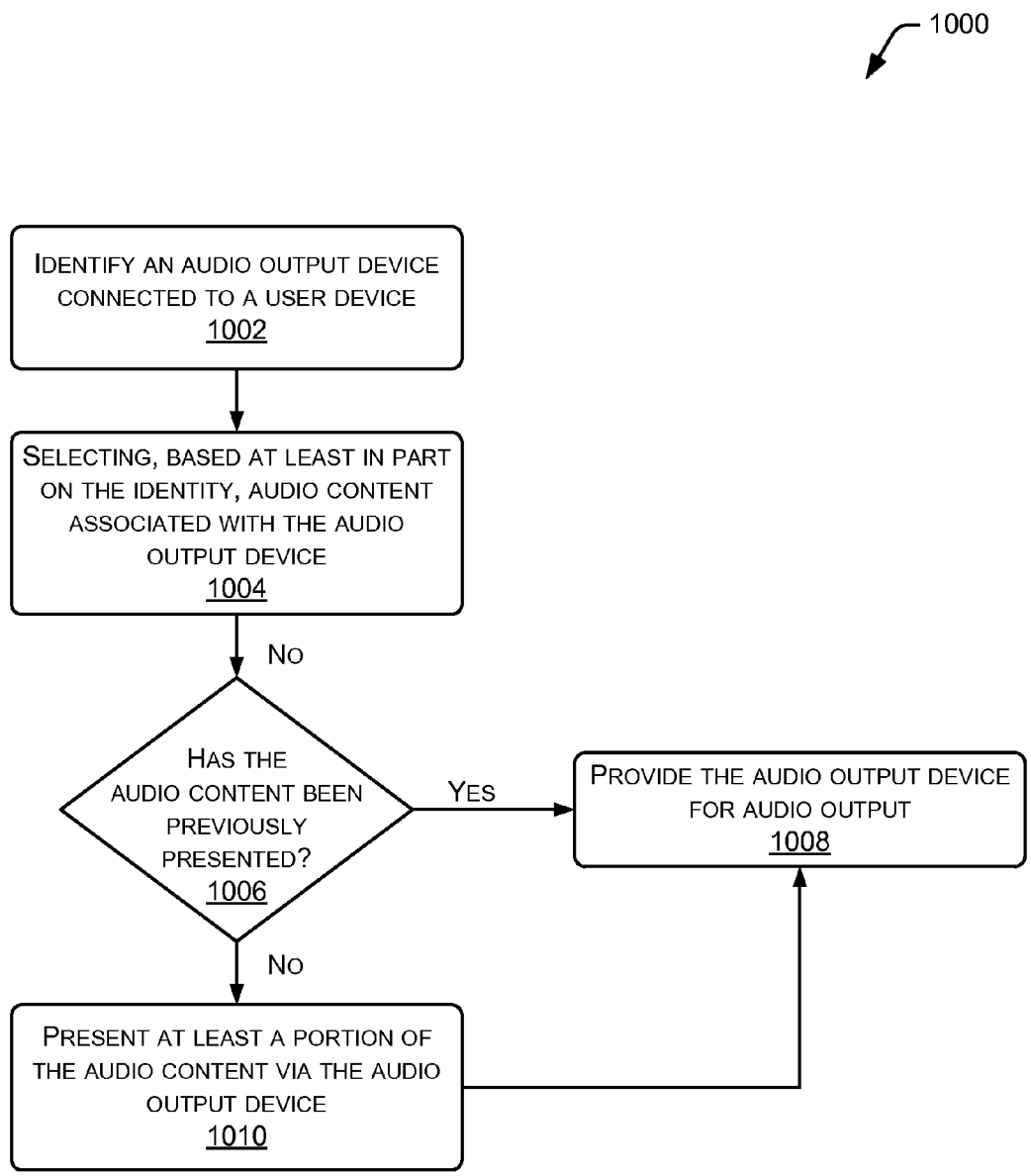
FIG. 10 illustrates a flow diagram of a process of selecting audio associated with an audio output device and presenting at least a portion of that audio in accordance with an embodiment of the disclosure.

FIG. 10 illustrates a flow diagram 1000 of a process of selecting audio associated with an audio output device and presenting at least a portion of that audio.

Block 1002 identifies the audio output device 106 connected to the user device 102 via the connection 108. This identification may be triggered by the establishment of the connection 108, or by another process, such as a resume from a low power mode.

Block 1004 selects, based at least in part on the identity, audio content 124 associated with the audio output device 106. In some implementations, one or more actions 302 may be selected instead of, or in addition to, the audio content 124. For example, as described above with regard to FIG. 3, connection of the headphones 106(2) may be associated with the action of playing the audio book service promotion.

Block 1006 determines when the audio content or the one or more actions have been previously presented or initiated. When the audio content or the one or more actions have been previously presented or initiated, the process proceeds to block 1008. Block 1008 provides the audio output device 106 for audio output.

In some implementations, block 1006 may be configured to support other determinations, such as a time elapsed since a last initiation of the associated action, user acceptance of a promotion or advertisement, or an occurrence of another condition. For example, as shown in FIG. 3, some actions 302 may configured to be initiated upon acceptance, such as the playing and display of the brand X headphone ad associated with the audio output device 106(4).

Returning to block 1006, when the audio content or the one or more actions have not been previously presented or initiated, the process proceeds to block 1010. Block 1010 presents at least a portion of the audio content 124 via the audio output device 106, or otherwise initiates the one or more actions. Continuing the example, the audio book service promotion may be played on the audio output device 106(2).

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatus, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
   an input/output interface configured to couple to an audio output device and generate an indication upon coupling, the audio output device comprising external speakers, headphones, headsets, earphones, or a vehicle audio system;
   at least one memory storing computer-executable instructions;
   at least one processor configured to access the input/output interface and the at least one memory and execute the computer-executable instructions configured to:
   receive the indication the audio output device is connected to the input/output interface;
   identify the audio output device connected to the input/output interface;
   access audio content comprising a plurality of advertisements;
   select, based at least in part on the identity of the audio output device, one or more portions of the audio content; and
   present the one or more portions of the audio content via the audio output device.

2. The system of claim 1, the input/output interface comprising a plurality of electrical conductors configured to establish an electrical connection during coupling with the audio output device and wherein the indication is generated based at least in part on completing an electrical circuit with at least a portion of the electrical conductors.

3. The system of claim 1, the input/output interface comprising a wireless communication device configured to establish a wireless audio connection during coupling with the audio output device.

4. The system of claim 1, further comprising at least one display coupled to the at least one processor, the instructions further configured to present a pre-determined advertising message on the at least one display at least partly in response to receiving the indication the audio output device is connected to the input/output interface.

5. One or more non-transitory computer-readable media storing computer-executable instructions that, when executed by at least one processor, configure the at least one processor to perform operations comprising:

identifying an audio output device connected to a user device, wherein the audio output device comprises external speakers, headphones, headsets, earphones, or a vehicle audio system;

determining a presence of a second audio output device proximate to the user device; and based at least in part on the identity of the audio output device and the presence of the second audio output device, selecting one or more actions configured to execute at least in part on the at least one processor, the one or more actions comprising generating a haptic output.

6. The computer-readable media of claim 5, receiving an indication of a connection between the user device and the audio output device, and wherein the identifying the audio output device is based at least in part on the receiving the indication.

7. The computer-readable media of claim 5, the one or more actions comprising presenting an audible promotional message using the audio output device.

8. The computer-readable media of claim 5, the one or more actions comprising one or more of playing at least a portion of an audio content or presenting information on a display.

9. The computer-readable media of claim 5, the identifying the audio output device comprising:

accessing identity data comprising one or more pre-determined operating characteristics of one or more pre-determined audio output devices;

determining one or more characteristics of the audio output device connected to the user device; and comparing at least a portion of the determined one or more characteristics with the pre-determined operating characteristics.

10. The computer-readable media of claim 9, the one or more pre-determined operating characteristics comprising one or more of a wiring configuration, an impedance of one or more acoustic transducers, or an identification value previously associated with the audio output device; and the one or more characteristics comprising one or more of: a wiring configuration, an impedance measured in one or more acoustic transducers, a determined number of channels, or an identification value provided by the audio output device.

11. The computer-readable media of claim 5, further comprising:

retrieving one or more pre-determined operating characteristics of the audio output device from a lookup table based at least in part on the identification; and the selecting the one or more actions further based at least in part on the one or more pre-determined operating characteristics.

12. The computer-readable media of claim 5, the determining the presence of the second audio output device comprising detecting a wireless signal from the second audio output device.

13. The computer-readable media of claim 5, the determining the presence of the second audio output device comprising receiving data from one or more of the second audio output device or a server.

14. The computer-readable media of claim 5, further comprising determining a location of the user device, and the selecting the one or more actions further based at least in part on the location data.

15. The computer-readable media of claim 14, wherein the location comprises a geographic location.

16. The computer-readable media of claim 5, the one or more actions comprising:

accessing audio content;

when the audio content has not been previously presented, presenting at least a portion of the audio content via the audio output device.

* * * * *